United States Patent [19]

Fong et al.

[11] 4,427,821

[45] Jan. 24, 1984

[54] HYDROGENATION OF RESIDUAL MONOMERS IN PARTIALLY POLYMERIZED ACRYLAMIDE COPOLYMERS IN LATEX FORM

[75] Inventors: Dodd W. Fong; Ronald J. Allain, both of Naperville, Ill.

[73] Assignee: Nalco Chemical Company, Oak Brook, Ill.

[21] Appl. No.: 443,270

[22] Filed: Nov. 22, 1982

Related U.S. Application Data

[63] Continuation of Ser. No. 289,637, Aug. 3, 1981.

[51] Int. Cl.$^3$ .............................................. C08F 6/14
[52] U.S. Cl. .................................... 524/555; 526/240
[58] Field of Search ......................... 524/555; 526/240

[56] References Cited

U.S. PATENT DOCUMENTS

| | | | |
|---|---|---|---|
| Re. 28,474 | 7/1974 | Anderson et al. | 260/29.6 H |
| Re. 28,576 | 10/1975 | Anderson et al. | 260/29.6 H |
| 2,827,964 | 3/1958 | Sandiford | 166/9 |
| 3,023,201 | 2/1962 | Moberly et al. | 260/94.7 |
| 3,039,529 | 6/1962 | McKennon | 166/9 |
| 3,284,393 | 11/1966 | Vanderhoff | 260/29.6 |
| 3,331,824 | 7/1967 | Folzenlogen et al. | 260/88.2 |
| 3,624,019 | 11/1971 | Anderson et al. | 260/29.6 H |
| 3,734,873 | 5/1973 | Anderson et al. | 260/29.6 HN |
| 3,767,629 | 10/1973 | Vallino et al. | 260/79.3 |
| 3,826,771 | 7/1974 | Anderson et al. | 260/29.6 H |
| 3,915,920 | 10/1975 | Slovinsky et al. | 260/901 |
| 3,979,348 | 9/1976 | Ballweber et al. | 260/29.4 UA |
| 3,996,180 | 12/1976 | Kane | 260/29.6 H |
| 3,997,492 | 12/1976 | Kane et al. | 260/29.6 H |
| 4,024,097 | 5/1977 | Slovinsky et al. | 260/29.6 HN |
| 4,273,722 | 6/1981 | Koritala | 260/409 |

OTHER PUBLICATIONS

Atlas HLB Surfactants Selector, *Practical Catalytic Hydrogenation*, by Morris Freifelder, Wiley-Interscience, pp. 16-17, 127.

*Primary Examiner*—Joseph L. Schofer
*Assistant Examiner*—Bernard Lipman
*Attorney, Agent, or Firm*—John G. Premo; Robert A. Miller; Donald G. Epple

[57] ABSTRACT

A method of reducing the monomer content of water-in-oil emulsions of partially polymerized acrylamide polymers which comprises catalytically hydrogenating the monomer at a temperature not greater than 100° C. and at a pressure below 500 psi.

4 Claims, No Drawings

HYDROGENATION OF RESIDUAL MONOMERS IN PARTIALLY POLYMERIZED ACRYLAMIDE COPOLYMERS IN LATEX FORM

This application is a continuation of application Ser. No. 289,637, filed Aug. 3, 1981.

INTRODUCTION

It is now known that acrylamide homopolymers and copolymers can be polymerized as a water-in-oil emulsion in the presence of a free radical catalyst to yield water-soluble polymers which are in the form of a water-in-oil emulsion. This polymerization technique is described in Vanderhoff, U.S. Pat. No. 3,284,393, the disclosure of which is incorporated herein by reference. It is further known that these water-in-oil emulsions of acrylamide-containing polymers may be inverted into water to produce rapid dissolution of the polymers. This phenomena is the subject of U.S. Pat. No. Re. 28,474 and U.S. Pat. No. Re. 28,576, the disclosures of which are incorporated herein by reference.

Of further interest is the fact that the intrinsic viscosity of these acrylamide latex polymers go through a maximum during the polymerization. The maximum viscosity usually occurs at about 80% conversion of the monomers into polymers. This is illustrated by Table I which shows data of a 30% by weight acrylic acid/70% by weight acrylamide latex polymer. This polymerization was conducted generally as described in column 6 of U.S. Pat. No. 3,979,348. The final product was a partially polymerized water-in-oil emulsion.

There are obvious advantages in obtaining these emulsions having acrylamide polymers capable of producing maximum intrinsic viscosity when dissolved in water. It is, of course, known that the higher the intrinsic viscosity, the greater the molecular weight. Such high molecular weight polymers are very efficient when they are used for enhanced oil recovery in processes of the type described in U.S. Pat. Nos. 3,039,529 and 2,827,964. Also, these high molecular weight polymers frequently have increased activity with respect to the removal of suspended solids from water.

Since these partially polymerized materials contain quantities of unpolymerized acrylamide, they present a problem with respect to their toxicity.

TABLE I

| % Polymerization by gc | | | |
|---|---|---|---|
| Acrylic Acid Na Salt | Acrylamide | Combination | IV based on gc |
| 3.0 | 8.9 | 7.13 | 28.7 |
| 10.5 | 29.5 | 23.8 | 23.4 |
| 19.8 | 38.4 | 32.8 | 37.0 |
| 41.2 | 61.9 | 55.7 | 43.6 |
| 67.0 | 85.4 | 79.9 | 38.6 |
| 69.4 | 86.5 | 81.4 | 52.6 |
| 87.3 | 96.7 | 93.9 | 41.9 |
| 91.0 | 98.4 | 96.2 | 37.5 |
| 91.5 | 98.3 | 96.3 | 49.9 |
| 94.8 | 99.1 | 97.8 | 33.3 |

It is known that acrylamide may be chemically reacted in a number of ways to convert it to another chemical specie or to destroy it. Such schemes, while capable of rendering the acrylamide and other water-soluble vinyl monomers less toxic, often tend to interfere with the properties of the polymer with which the monomer is associated.

One of these techniques for removing acrylamide as a toxic from an acrylamide polymer system in which it is contained is to hydrogenate the double bond. This also is an obvious method for converting other toxic or undesirable vinyl monomers to less toxic species.

In order to hydrogenate acrylamide and other vinyl monomers when they are present in the form of aqueous solutions, it is possible to do so using elevated temperatures and pressures. This, of course, requires high pressure systems and, unfortunately, subjects the polymer to degradative conditions.

It is apparent to those skilled in the art that if one were to attempt hydrogenation of the water-in-oil emulsions described above which contain unreacted acrylamide and/or other vinyl monomers, that one would expect very high temperatures and pressures to be required since the monomer is shielded by a coating of oil which is the continuous phase of the emulsion.

The present invention is predicated upon the discovery that acrylamide and other water-soluble vinyl monomers can be changed to non-toxic compounds from partially polymerized water-in-oil emulsions containing polymers formed from these monomers by subjecting them to a catalytic hydrogenation reaction using low temperatures and pressures.

THE INVENTION

A method of reducing the monomer content of water-in-oil emulsions of partially polymerized acrylamide polymers which comprises catalytically hydrogenating the monomer at a temperature not greater than 100° C. and at a pressure below 500 psi.

THE ACRYLAMIDE POLYMERS

The acrylamide polymers include polyacrylamide and its water-soluble copolymeric derivatives such as acrylamide/acrylic acid and acrylamide/acrylic acid salt copolymers.

The acrylamide polymers contain from about 95–5 percent by weight of acrylamide. Also useful are copolymers of acrylamide with other vinyl monomers such as maleic anhydride, acrylonitrile, styrene, and the like. It is preferred in the practice of this invention to use acrylamide polymers which are water-soluble and which contain at least 5 percent by weight of acrylamide.

The molecular weight of the acrylamide polymers described above may vary over a wide range, e.g.: 10,000–25,000,000.

The polymers most susceptible to treatment by the process of the invention are the acrylamide sodium acrylate copolymers which, preferably, contain at least 50% by weight of acrylamide in their makeup.

THE WATER-IN-OIL EMULSIONS OF ACRYLAMIDE POLYMERS

The water-in-oil emulsions of acrylamide polymers useful in this invention contain four basic components. These components and their weight percentages in the emulsions are listed below:

A. Acrylamide:
1. Generally from 5–60%;
2. Preferably from 20–40%; and
3. Most preferably from 25–35%;

B. Water:
1. Generally from 20–90%;
2. Preferably from 20–70%; and
3. Most preferably from 30–55%;

C. Hydrophobic liquid:
1. Generally from 5–75%;
2. Preferably from 5–40%; and
3. Most preferably from 20–30%; and D. Water-in-oil emulsifying agent:
1. Generally from 0.1–21%;
2. Preferably from 1–15%;
3. Most preferably from 1.2–10%.

It is also possible to further characterize the water-in-oil emulsions of acrylamide polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and, most preferably, from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and, most preferably, from 1.0–2.75.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the tradename "Isopar M" described in U.S. Pat. No. 3,624,019 and a paraffinic solvent sold by the Exxon Company, U.S.A. called "Low Odor Paraffinic Solvent." Typical specifications of this material are set forth below in Table II.

TABLE II

| | |
|---|---|
| Specific Gravity 60°/60° F. | 0.780–0.806 |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer 15 max. | |

While paraffinic oils are the preferred materials for use in preparing the water-in-oil emulsions of this invention, other organic liquids can be utilized. Thus, mineral oils, kerosenes, naphthas, and in certain instances, petroleum, may be used. While useful in this invention, solvents such as benezene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF THE ACRYLAMIDE POLYMERS

The general method for the preparation of emulsions of the type described above is contained in Vanderhoff, U.S. Pat. No. 3,284,393, which is hereinafter incorporated by reference. A typical procedure for preparing water-in-oil emulsions of this type includes preparing an aqueous solution of acrylamide or acrylamide and other comonomers and adding this solution to one of the hydrocarbon oils described above. With the addition of a suitable water-in-oil emulsifying agent and under agitation, the emulsion is then subjected to free radical polymerization conditions and a water-in-oil emulsion of the acrylamide polymer is obtained. It should be pointed out that the ingredients are chosen based upon the weight percentages given above and their compatability with each other. As to choice of free radical catalyst, these materials may be either oil or water-soluble and may be from the group consisting of organic peroxides, Vazo-type materials, redox-type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, U.S. Pat. No. Re. 28,474, U.S. Pat. No. 3,734,873, U.S. Pat. No. Re. 28,576, U.S. Pat. No. 3,826,771, all of which are hereinafter incorporated by reference, the use of air may be employed to control polymerization. This technique is described in U.S. Pat. No. 3,767,629, which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest is U.S. Pat. No. 3,997,492, which describes the formation of water-in-oil emulsions of the type above described utilizing emulsifiers having HLB values of between 4–9.

These polymerizations are conducted under conditions whereby complete polymerization is not achieved. Usually, periodic sampling of the polymerization products will be taken and subjected to viscosity studies whereby maximum viscosity, which results from incomplete polymerization, would be achieved in aqueous solutions.

PHYSICAL PROPERTIES OF THE WATER-IN-OIL EMULSIONS

The water-in-oil emulsions of the finely divided water-soluble polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. Generally, the smaller the particle obtained, the less viscous the emulsion.

THE PARTIALLY POLYMERIZED ACRYLAMIDE POLYMERS

As indicated, the invention is primarily directed to reducing the monomer content of partially polymerized acrylamide polymers. The degree of polymerization which produces the sought-after high molecular weight species of acrylamide polymers, when produced by water-in-oil emulsion polymerization technique, is about 80%. It is understood that greater or lesser degrees of polymerization which results in residual monomer in the finished product may be treated by the teachings of the invention.

CONDITIONS OF HYDROGENATION

The conditions that control the hydrogenation of the acrylamide and other monomers contained in the water-in-oil emulsions of the partially polymerized acrylamide polymers are temperature, pressure, time, and catalyst, and its concentration.

THE TEMPERATURE

The temperature used to hydrogenate the unwanted monomers in accordance with the invention should not exceed 100° C. Preferably, it is within the range of 20°–50° C.

PRESSURE

The pressure should be below 500 psi; preferably below 200 psi; a most preferred range is 100–175 psi.

TIME

The time at which the hydrogenation reaction is conducted may range from as little as about 15–30 minutes up to about 10 hours, depending upon the pressure and temperature employed.

THE HYDROGENATION CATALYST

While any of the known double bond hydrogenation catalysts may be used, nickel and its various catalytic forms are preferred. Thus finely divided nickel, Raney nickel, or nickel on a carrier such as kieselguhr, may be used. In addition, other well-known hydrogenation catalysts such as Ziegler-type copper catalysts (see U.S. Pat. No. 4,273,722) may be employed. The amount of hydrogenation catalyst in relation to the amount of unsaturated monomer present may vary from as little as 0.001% up to as much as 1–2% by weight based on the starting latex.

Various inorganic salts of such metals as ruthenium, cobalt, iron, palladium, platinum, iridium, rhodium, cobalt-molybdenum on an alumina carrier, and Raney nickel may be used. For other additional information, see *Practical Catalytic Hydrogenation*, by Morris Freifelder, Wiley-Interscience, p. 16–17, 127.

In selecting a particular catalyst, it is important it does not disturb the stability of the emulsion being treated.

ILLUSTRATION OF THE INVENTION

To illustrate the invention, a variety of partially polymerized water-in-oil emulsions of a 35% sodium acrylate acrylamide copolymer were subjected to hydrogenation under a variety of conditions.

The degree of polymerization was about 80%. The general emulsion polymerization was of the type described in U.S. Pat. No. 3,979,348. The catalyst was 2,2'azobis (isobutyronitrile).

The oil-soluble emulsifier was a blend of Sorbitan monostearate and is a 4 mole propylene oxide adduct. It provided an HLB of about 4 to the system.

The results of the various hydrogenations of different laboratory and commercial polymers are set forth below in Table III. Based on the data in Table I, it should be noted that it was possible to substantially reduce the acrylamide monomer content of these polymers using very mild hydrogenation conditions. This means that it is possible to conduct these reactions using conventional plant equipment. This means that high pressure equipment is not required to practice the invention.

The invention is susceptible to many modifications. For example, it is possible that the hydrogenation can be conducted by using a fixed bed reactor containing the catalyst over which the hydrogen and water-in-oil emulsion to be treated would be flowed in counter-current fashion.

TABLE III

Hydrogenation of Partially Polymerized Acrylamide Na Acrylate Copolymer[1]

| | Catalyst (concentration % b.o. latex) | Hydrogenation Conditions | AcAm | Residual NaA | RSV |
|---|---|---|---|---|---|
| Polymer I | — | — | 1.1 | 2.3 | 43.9 |
| Hydrogenated Polymer I | H$_2$PtCl$_6$ (0.1) | 150 psi @ 40° C. 3 hrs. | <0.4 | <0.4 | 3.1 |
| Hydrogenated Polymer I | Pd acetylacetonate (0.1) | 150 psi @ 40° C. 3 hrs. | <0.4 | <0.4 | 41.1 |
| Polymer IIA | — | — | 29.9 | 15.3 | — |
| Hydrogenated Polymer IIA | Pd acetylacetonate (0.0096) | 120 psi @ 40° C. 3 hrs. | 6.6 | 6.4 | 60.3 |
| Polymer IIB | — | — | 7.2 | 5.2 | — |
| Hydrogenated Polymer IIB | Pd acetylacetonate (0.005) | 120 psi @ 40° C. 5 hrs. | 2.7 | 2.1 | 50.3 |
| Polymer IIC | — | — | 6.4 | 5.3 | — |
| Hydrogenated Polymer IIC | Ni on Kieselguhr (0.1) | 120 psi @ 40° C. 3 hrs. | 1.1 | 2.4 | 47.8 |
| Polymer IID | — | — | 5.6 | 4.7 | 48.2 |
| Hydrogenated Polymer IID | Ni on Kieselguhr (0.05) | 120 psi @ 40° C. 3½ hrs. | 0.2 | 1.0 | 63.9 |
| Polymer III | — | — | 6.2;8.3 | 9.5;9.7 | 54;60.4 |
| Hydrogenated Polymer III | No catalyst | 120 psi @ 40° C. 3 hrs. | 9.5 | 9.5 | 64.3 |
| Hydrogenated Polymer III | Ni acetylacetonate (0.1) | 120 psi @ 40° C. 3½ hrs. | 7.6 | 10.8 | 67 |
| Hydrogenated Polymer III | Ni acetate (0.1) | 120 psi @ 40° C. 4½ hrs. | 6.5 | 7.9 | 50.6 |
| Hydrogenated Polymer III | Ni on Kieselguhr (0.1) | 120 psi @ 40° C. 3½ hrs. | 1.3 | 6.8 | 57.7 |
| Hydrogenated Polymer III | Ni on Kieselguhr (0.065) | 100 psi @ 50° C. 4 hrs. | <0.4 | 1.8 | 61.6 |

[1] 35% by weight of polymer.

Having thus described our invention, it is claimed as follows:

1. A method of reducing the monomer content of water-in-oil emulsions of partially polymerized acrylamide polymers containing at least 5% by weight acrylamide which comprises hydrogenating the unpolymerized monomer contained in the water-in-oil emulsion in the presence of a double bond hydrogenation catalyst at a temperature not greater than 100° C. and at a pressure below 500 psi, said hydrogenation catalyst not disturbing the stability of the water-in-oil emulsion being treated.

2. The method of claim 1 where the partially polymerized acrylamide polymer is an acrylamide sodium acrylate copolymer which contains less than 50% by weight of sodium acrylate.

3. The method of claim 1 where the temperature is not greater than 100° C. and the pressure does not exceed 200 psi.

4. The method of claim 1 where the temperature is within the range of 20°–50° C. and the pressure is within the range of 100–175 psi.

* * * * *